US008905909B2

(12) United States Patent
Crawford et al.

(10) Patent No.: US 8,905,909 B2
(45) Date of Patent: Dec. 9, 2014

(54) SYSTEM FOR FILLING A CONTAINER WITH HAZARDOUS WASTE

(71) Applicant: EnergySolutions, LLC, Salt Lake City, UT (US)

(72) Inventors: Gordon Crawford, Richland, WA (US); David Skeath, West Richland, WA (US); Gary Buss, West Richland, WA (US)

(73) Assignee: EnergySolutions, LLC, Salt Lake City, UT (US)

( * ) Notice: Subject to any disclaimer, the term of this patent is extended or adjusted under 35 U.S.C. 154(b) by 70 days.

(21) Appl. No.: 13/970,290

(22) Filed: Aug. 19, 2013

(65) Prior Publication Data

US 2014/0013708 A1 Jan. 16, 2014

Related U.S. Application Data

(62) Division of application No. 12/267,290, filed on Nov. 7, 2008, now Pat. No. 8,512,216.

(60) Provisional application No. 60/986,585, filed on Nov. 8, 2007.

(51) Int. Cl.

| | |
|---|---|
| ***C03B 5/027*** | (2006.01) |
| ***G21F 9/22*** | (2006.01) |
| ***G21F 5/06*** | (2006.01) |
| ***G21F 9/16*** | (2006.01) |

(52) U.S. Cl.
CPC .. *G21F 5/06* (2013.01); *G21F 9/22* (2013.01); *G21F 9/16* (2013.01)
USPC .......................................... 588/252; 588/259

(58) Field of Classification Search
USPC .............. 588/3, 403, 249, 252, 259, 900, 901
See application file for complete search history.

(56) References Cited

U.S. PATENT DOCUMENTS

| | | | |
|---|---|---|---|
| 3,932,979 | A | 1/1976 | Stock et al. |
| 4,299,722 | A | 11/1981 | Stock et al. |
| 4,427,023 | A | 1/1984 | Greaves |
| 4,582,638 | A | 4/1986 | Homer et al. |
| 4,717,510 | A | 1/1988 | James |
| 4,761,127 | A | 8/1988 | O'Brien et al. |
| 5,108,715 | A | 4/1992 | Jekat et al. |
| 5,173,217 | A | 12/1992 | Buckle |

(Continued)

FOREIGN PATENT DOCUMENTS

| | | |
|---|---|---|
| DE | 24 21 142 | 11/1975 |
| GB | 1 603 729 | 5/1978 |

OTHER PUBLICATIONS

Burbank, D.A., et al., "Waste Immobilization Demonstration Program for the Hanford Site's Mixed Waste Facility," Westinghouse Hanford Company, May 1994 (10 pp.).

*Primary Examiner* — Edward Johnson
(74) *Attorney, Agent, or Firm* — Holland & Hart

(57) ABSTRACT

A system for filling a container with hazardous waste includes a primary confinement chamber that houses a lid handling mechanism and a filling head. The lid handling mechanism may be used to remove and/or recouple the lid to the container as part of the process of filling the container in such a way to ensure the exterior of the container is not contaminated by the hazardous waste. The filling head may be configured to add the hazardous waste to the container, mix the contents of the container, and/or vent air from the container.

10 Claims, 13 Drawing Sheets

(56) References Cited

U.S. PATENT DOCUMENTS

| | | | |
|---|---|---|---|
| 5,378,410 | A | 1/1995 | Erbse et al. |
| 5,489,741 | A | 2/1996 | Weszely |
| 5,566,727 | A | 10/1996 | Erbse et al. |
| 5,676,185 | A | 10/1997 | Starr et al. |
| 5,740,545 | A | 4/1998 | Maxwell et al. |
| 5,972,291 | A | 10/1999 | Healy et al. |
| 6,041,669 | A | 3/2000 | Brassell et al. |
| 6,257,803 | B1 | 7/2001 | McCabe et al. |
| 6,647,700 | B1 | 11/2003 | Tibrea et al. |
| 6,666,003 | B1 | 12/2003 | Allais et al. |
| 6,734,334 | B2 | 5/2004 | Chekhmir et al. |
| 6,785,355 | B2 | 8/2004 | Georgii |
| 6,809,329 | B1 | 10/2004 | Evans et al. |
| 6,991,593 | B2 | 1/2006 | Price et al. |
| 7,022,292 | B2 | 4/2006 | Kawaski et al. |
| 8,512,216 | B2 | 8/2013 | Crawford et al. |

SYSTEM FOR FILLING A CONTAINER WITH HAZARDOUS WASTE

CROSS-REFERENCE TO RELATED PATENT APPLICATIONS

This patent application is a divisional of U.S. Pat. No. 8,512,216, titled "System for and Method of Filling a Container with Hazardous Waste," issued on 20 Aug. 2013, which claims priority to U.S. Provisional Patent Application No. 60/986,585, titled "System for and Method of Filling a Container with Hazardous Waste," filed on 8 Nov. 2007, both of which are incorporated by reference herein in their entireties.

BACKGROUND

Hazardous waste material is a waste material that has properties that make it dangerous or potentially harmful to human health or the environment. The universe of hazardous waste is large and diverse. Hazardous waste includes chemical waste, biological waste, radioactive waste, and the like. Hazardous waste can be found as a liquid, solid, contained gas, sludge, slurry, and the like. Hazardous waste is often a by-product of manufacturing processes or simply discarded commercial products, like cleaning fluids or pesticides.

There are a host of hazardous wastes that are difficult to dispose of due to the possibility of contamination of the environment and/or those that handle the hazardous waste during disposal. These hazardous wastes include materials such as dioxins, polychlorobiphenyls, heavy metals, sewage, radioactive materials, and the like.

Radioactive waste is one example of a hazardous waste material that is subject to strict regulations governing disposal and handling of the waste. In the United States, radioactive waste may be classified in one of the following general categories: (1) spent nuclear fuel from nuclear reactors and high-level waste from reprocessing spent nuclear fuel, (2) transuranic waste resulting mainly from by-products of defense programs, (3) uranium mill tailings resulting from mining and milling of uranium ore, (4) low-level waste resulting from contaminated industrial or research waste, and (5) naturally occurring radioactive materials. Mixed waste is waste that may contain both radioactive components and other hazardous components. Other countries may use similar or different terms to classify radioactive waste that is treated in a similar manner (e.g., Intermediate Level Waste (ILW) in the U.K. is treated in roughly the same way as transuranic waste is treated in the U.S.).

Transuranic, or TRU, waste generally includes materials such as soils, sludges, solids, and the like that have been contaminated with manmade radioisotopes heavier than uranium. These elements may include plutonium, neptunium, americium, curium, and californium. Transuranic waste can be produced as a result of reprocessing spent nuclear fuel, during nuclear fuel assembly, and during nuclear weapons research, production, and cleanup.

Transuranic waste may be divided into the following categories, based on its level of radioactivity: contact-handled transuranic waste (CH-TRU) and remote-handled transuranic waste (RH-TRU). CH-TRU is typically packaged in 55-gallon metal drums that can be handled under controlled conditions without any shielding beyond the container itself. The maximum radiation dose at the surface of a contact-handled transuranic waste container is approximately 200 millirems per hour. Contact-handled waste primarily emits alpha particles that may be shielded by a sheet of paper or the outer layer of a person's skin.

RH-TRU emits more radiation than contact-handled transuranic waste and therefore is typically handled and transported in shielded containers. Surface radiation levels of unshielded containers of remote-handled transuranic waste exceed 200 millirems per hour. Remote-handled waste primarily emits gamma radiation, which may be highly penetrating and requires concrete, lead, or steel to block it.

Conventionally, one way to dispose of hazardous waste has been to encapsulate the hazardous waste in cementitious material. Typically, this is done by mixing the cementitious material and the hazardous waste together in a suitable container, e.g., a 55-gallon drum. The cementitious material solidifies to form a solid block of encapsulated waste inside the container.

Unfortunately, conventional systems and techniques for filling the container suffer from a number of drawbacks. In conventional systems, the container is supplied with dry cementitious powders at the same time, or just before or just after, the container is filled with hazardous waste. This causes cement dust to build up on the equipment used to handle the hazardous waste resulting in increased maintenance requirements. The HEPA filters are especially impacted because they must prevent the cement dust from leaving the confined filling area (e.g., a glove box). The cement dust may be considered to be contaminated for purposes of handling and disposal since the cement dust is in the same area as the hazardous waste.

Another problematic aspect of conventional systems is that the container may be moved from station to station with the container open thereby increasing the potential for contamination. For example, a conventional system may move the container between stations to perform the following actions: take the lid off the container, fill the container with hazardous waste, add cement, and put the lid back on the container. Moving the open container multiple times in this manner only serves to increase the potential for the spread of contamination to the exterior of the container, the processing equipment, and/or the worker.

SUMMARY

A variety of embodiments of a system and/or method for filling a container with hazardous waste are described herein. It should be appreciated that the system may be used to fill any suitable container with any suitable hazardous waste material. In one embodiment, the system is configured to be used to fill the container with radioactive waste such as transuranic waste. The system may prevent alpha particles from escaping from the transuranic waste and contaminating the surrounding area. The system may also use a bagless transfer type configuration to isolate any potential contamination to a primary confinement chamber. It should be appreciated that U.S. terms for radioactive waste, such as "transuranic" and the like, are intended to also refer to radioactive waste in other countries that is treated in a similar fashion regardless of what label is used to refer to such waste in the other countries.

The system may include a primary confinement chamber where the container is filled with hazardous waste. A number of mechanisms may be positioned in the primary confinement chamber to perform a variety of operations. In one embodiment, the primary confinement chamber may include one or more mechanisms to: add hazardous waste to the container, mix the contents of the container, remove air from the container, add dry cementitious material to the container, add wet and/or dry cement modifiers, add premixed wet cementitious materials to the container, add cementitious material to seal off the top of the lid, measure the level and test whether the contents of the container meet quality assurance requirements (e.g., penetrometer, and so forth).

In one embodiment, a filling head may be configured to add solid or liquid hazardous waste to the container, drive movement of a mixing mechanism in the container, and vent air from the container. The filling head may also be configured to perform any of the other listed functions. It should be appreciated that a single mechanism may be used to perform any single function or combination of functions. Examples of suitable mechanisms that may be configured to perform one or more of these functions include a lid handling mechanism, a filling head, rotary arms, carousels, sliding trolleys, and so forth.

In another embodiment, the system may include a filling head and a lid handling mechanism both of which are positioned in the primary confinement chamber. The filling head may be configured to add the hazardous waste to the container, drive movement of a mixing mechanism in the container, and vent air from the container. The lid handling mechanism may be configured to remove and/or recouple a lid to the container. The filling head, lid handling mechanism, and/or one or more other mechanisms may be configured to add cementitious material (wet or dry), seal the top of the lid, and/or gather quality assurance and/or process information.

A method of filling the container with hazardous waste may include moving the container to a first location where a filling head adds the hazardous waste to the container, vents air from the container, and mixes the hazardous waste in the container. After filling, the lid may be coupled to the container while the container is still at the first location. This eliminates the need to move the container between stations thereby minimizing the risk of contamination. The method may also include adding cementitious material (wet or dry) to the container while it is at the first location, sealing the top of the lid with cementitious material, and/or gathering quality assurance and/or process information.

Another method of filling the container with hazardous waste may include pre-filling the container with a solidifying material and moving the container to a first location where a filling head adds the hazardous waste to the container. A lid may be coupled to the container while the container is at the first location. Any of the additional procedures mentioned previously may also be performed while the container is at the first location.

Another method of filling the container with hazardous waste may include moving the container to a first location where a lid handling mechanism removes the container inner lid, a filling head adds solid hazardous waste to the container and vents displaced air from the container. After filling, the lid may be coupled to the container while the container is still at the first location. This eliminates the need to move an open container between stations thereby minimizing the risk of spreading contamination.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

DRAWINGS

Figure 7:
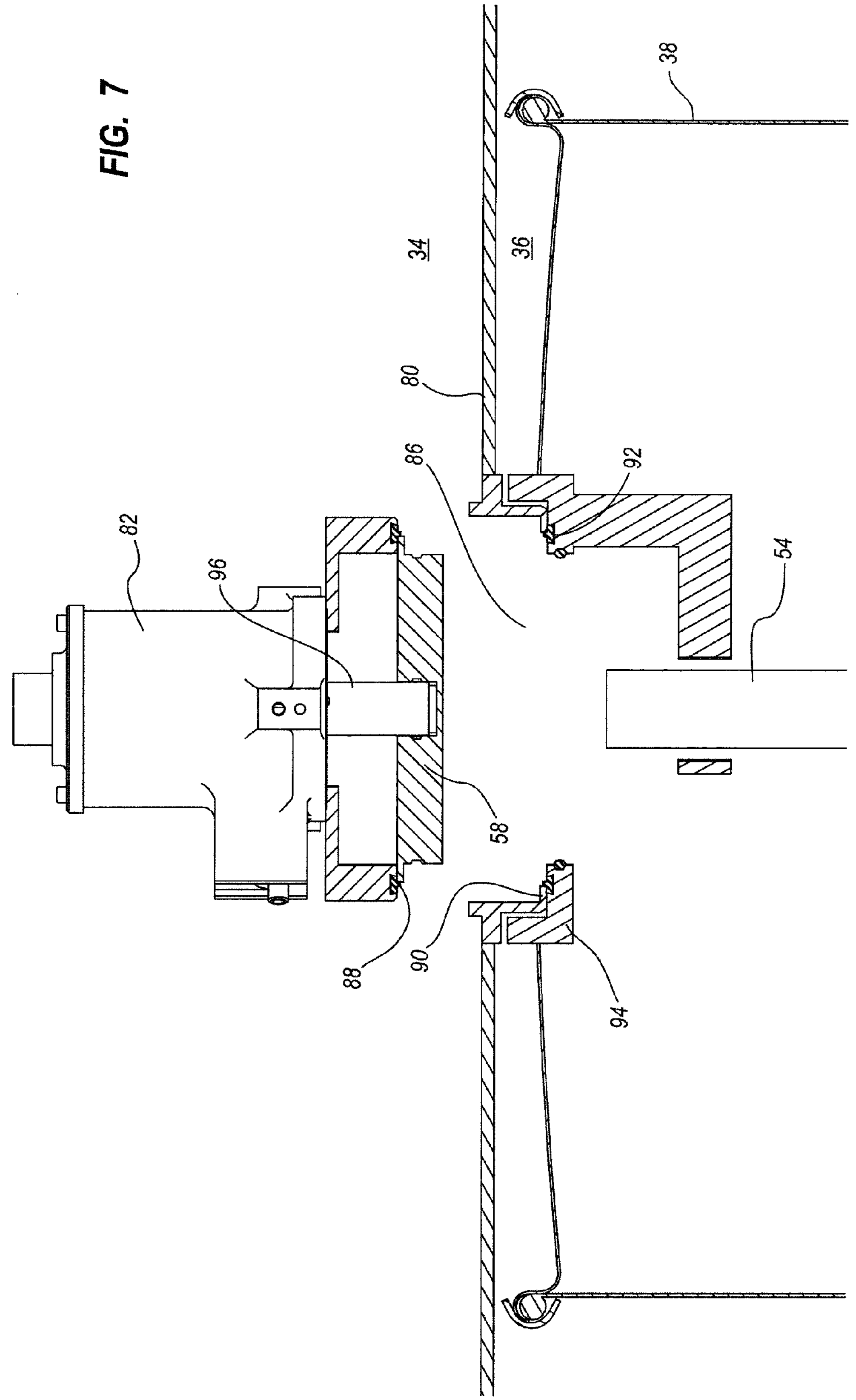

FIG. 7 is a sectional view of the container in sealing contact with the dividing wall after the lid handling mechanism has removed the lid. The interior of the container is open to the primary confinement chamber. The lid is coupled to the lid handling mechanism in a manner that prevents the underside of the lid handling mechanism and the outer surface of the lid from being exposed to the primary confinement chamber.

Figure 8:
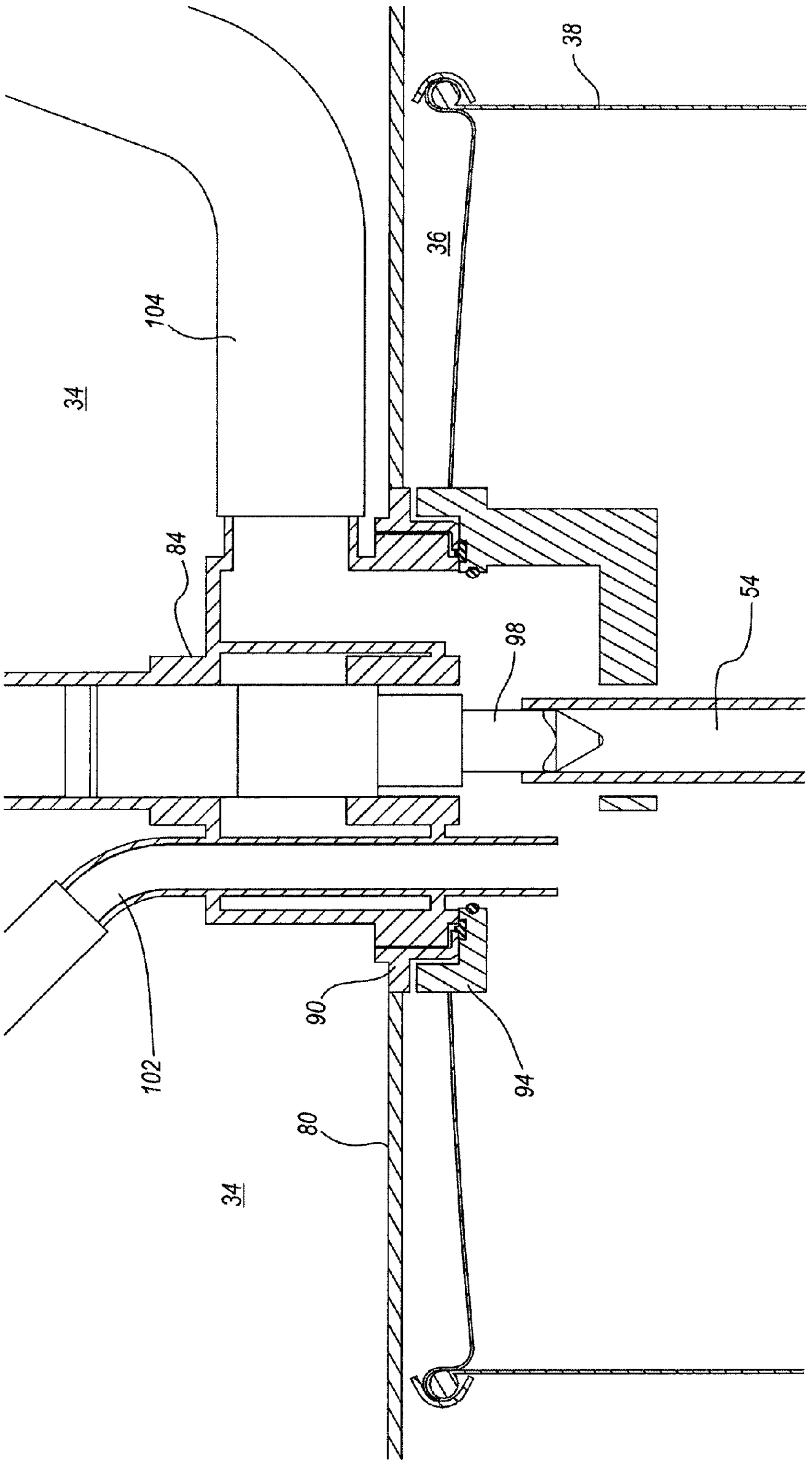

FIG. 8 is a sectional view of one embodiment of a filling head in sealing contact with the dividing wall and/or the container.

Figure 1:
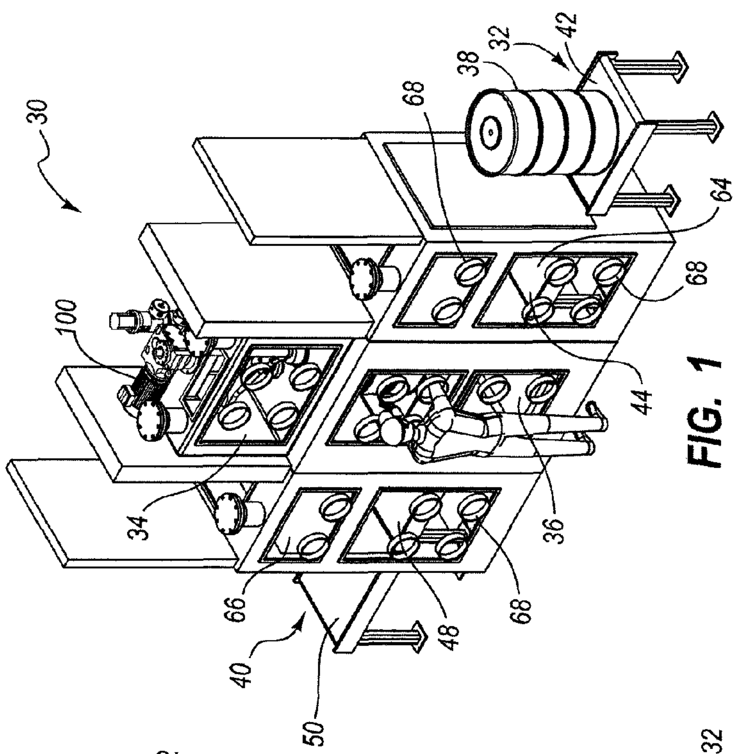
FIG. 1 is a perspective view of one embodiment of a system for filling a container with hazardous waste.
Figure 3:
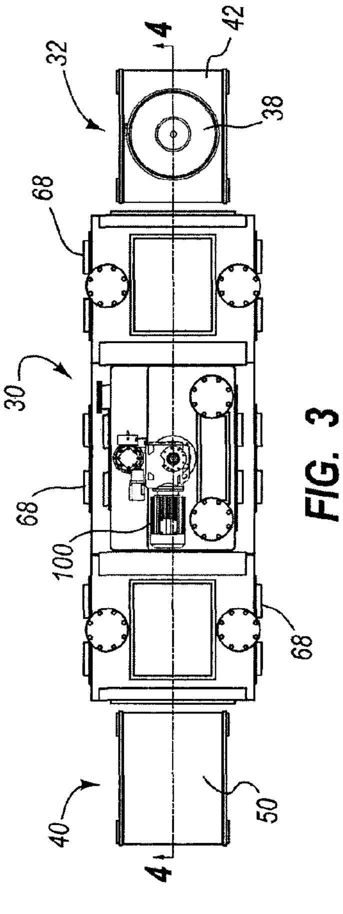
FIG. 3 is a top view of the system shown in FIG. 1.
Figure 2:
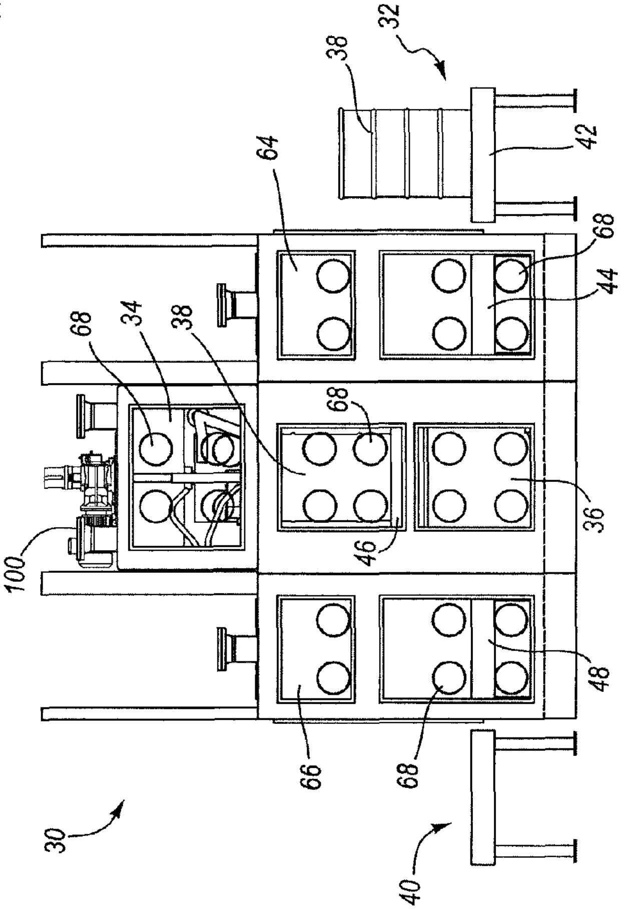
FIG. 2 is a front view of the system shown in FIG. 1.
Figure 4:
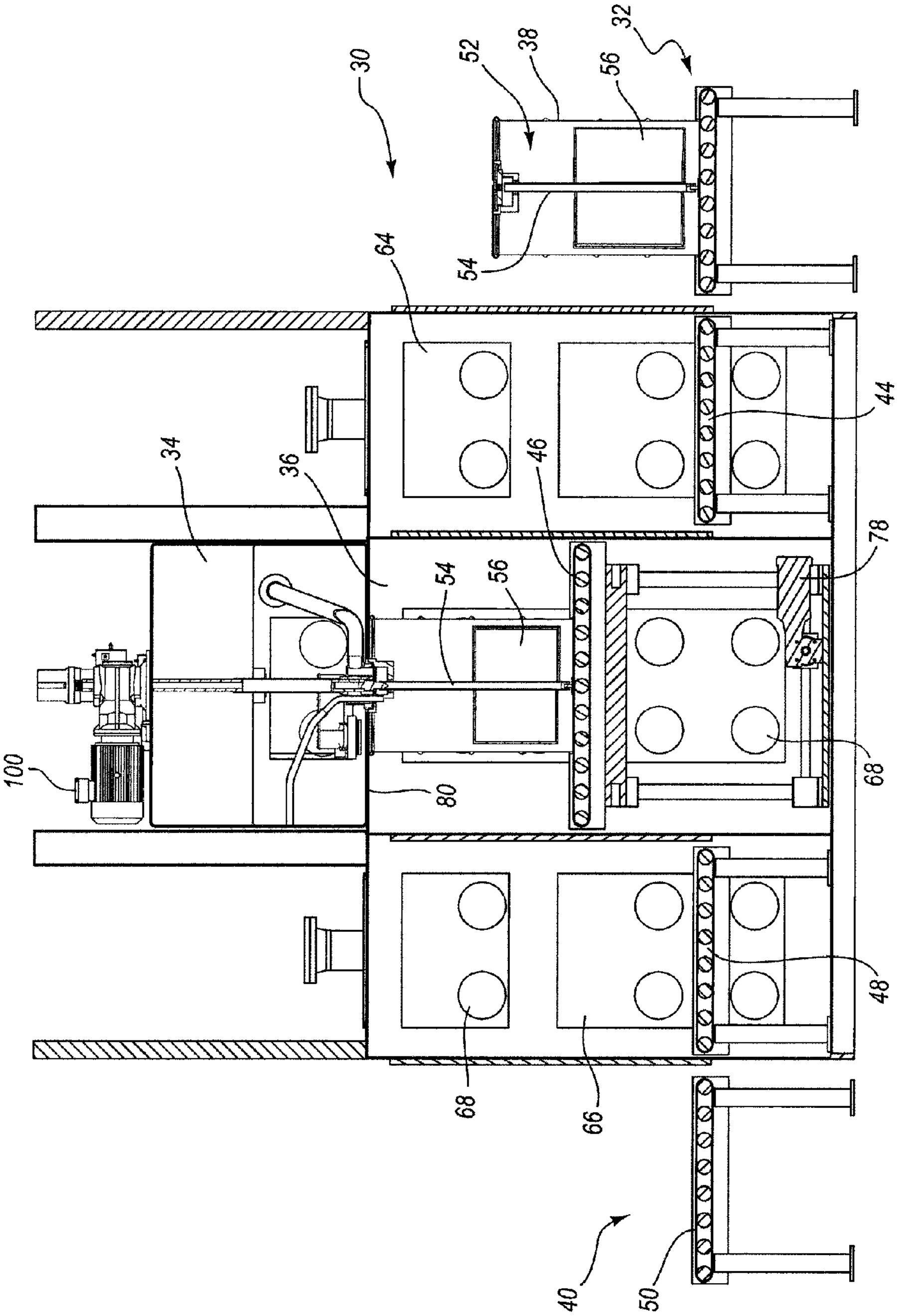
FIG. 4 is a front sectional view of the system along line 4-4 shown in FIG. 3.

FIGS. 9-13 are sectional views illustrating the process of filling a container using the system shown in FIG. 1. The sectional views are along line 4-4 shown in FIG. 3.

Figure 9:
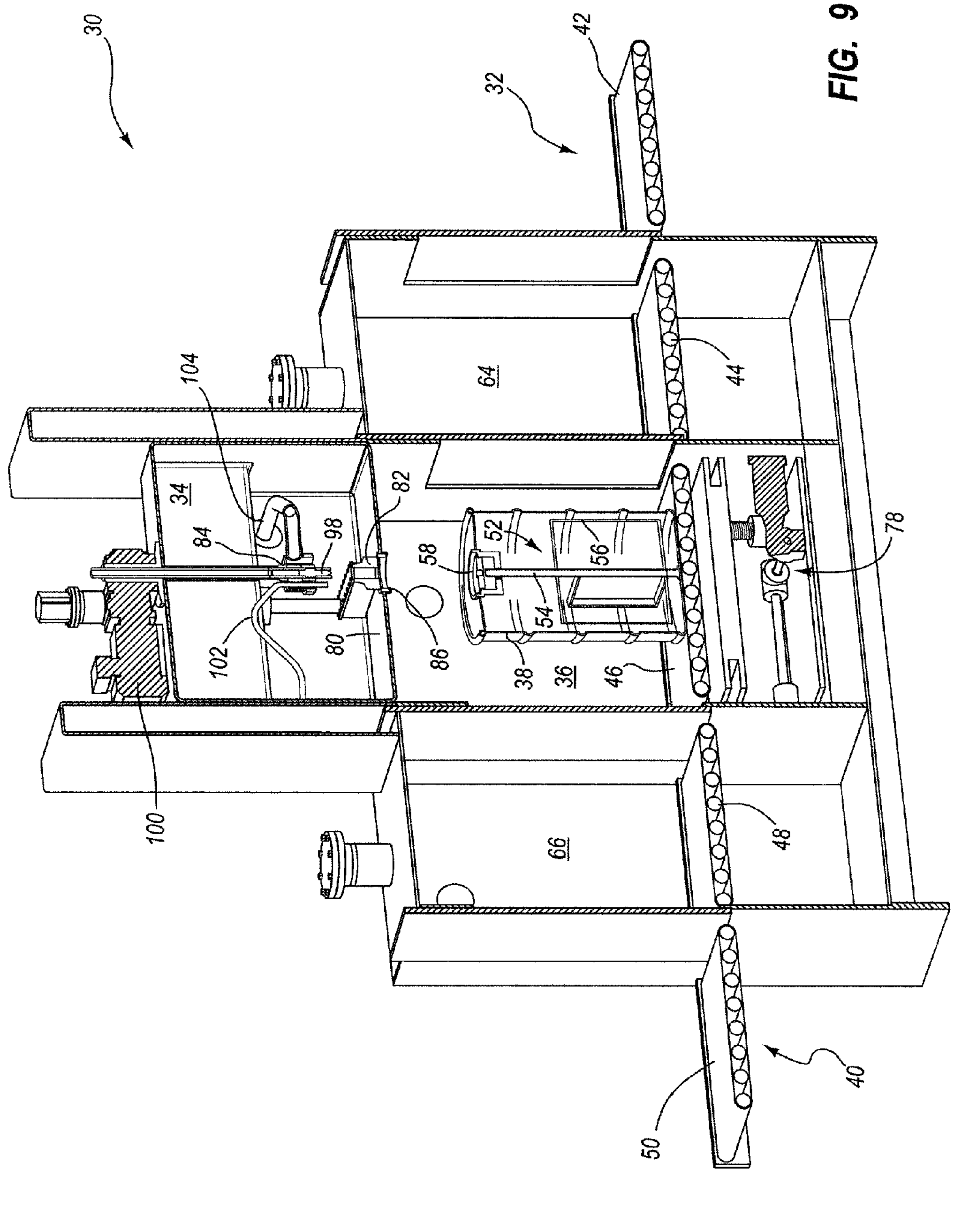

FIG. 9 shows the container positioned in the second confinement chamber with the lid handling mechanism in sealing contact with the dividing wall.

Figure 10:
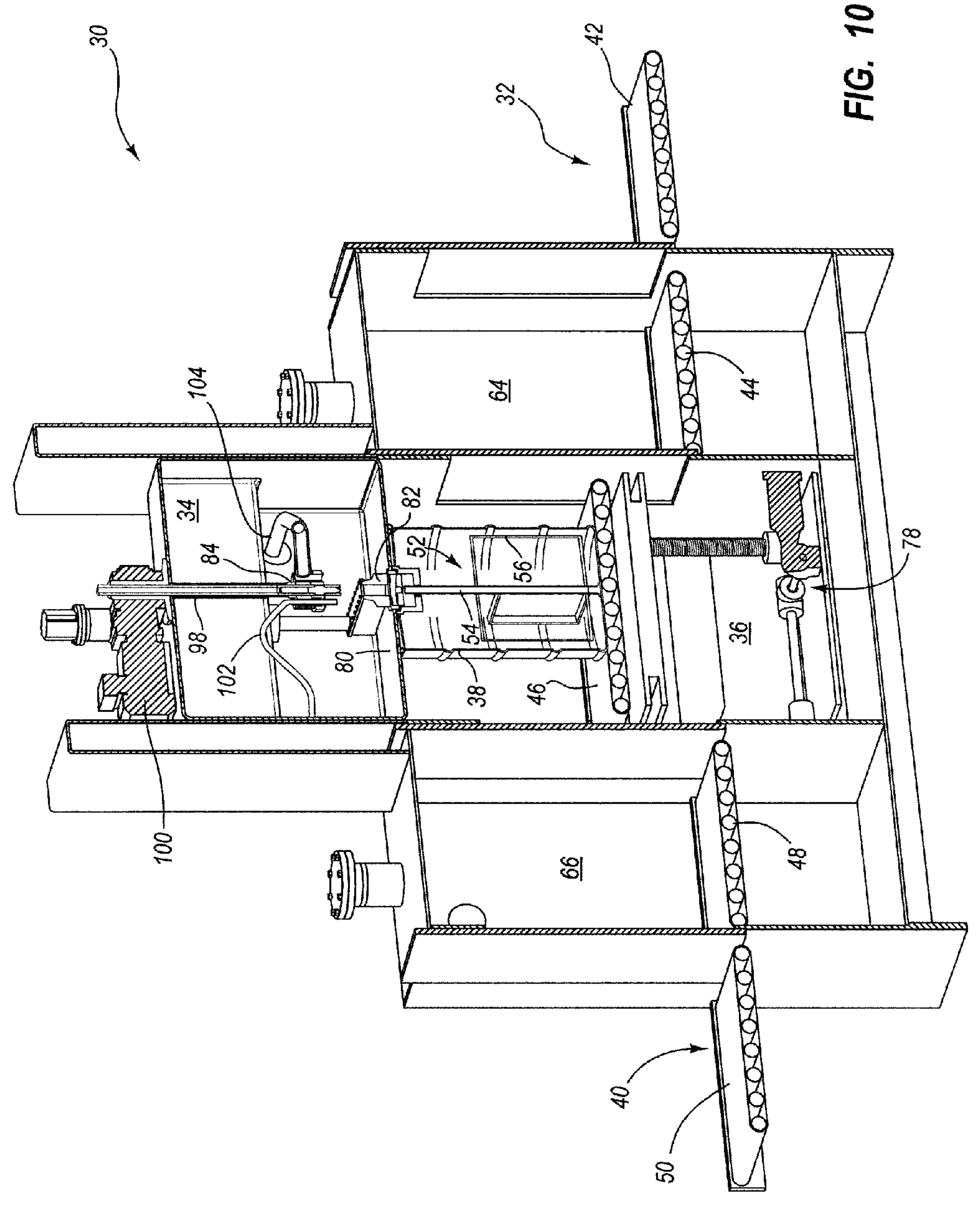

FIG. 10 shows the container raised and in sealing contact with the dividing wall between the primary confinement chamber and the secondary confinement chamber.

Figure 11:
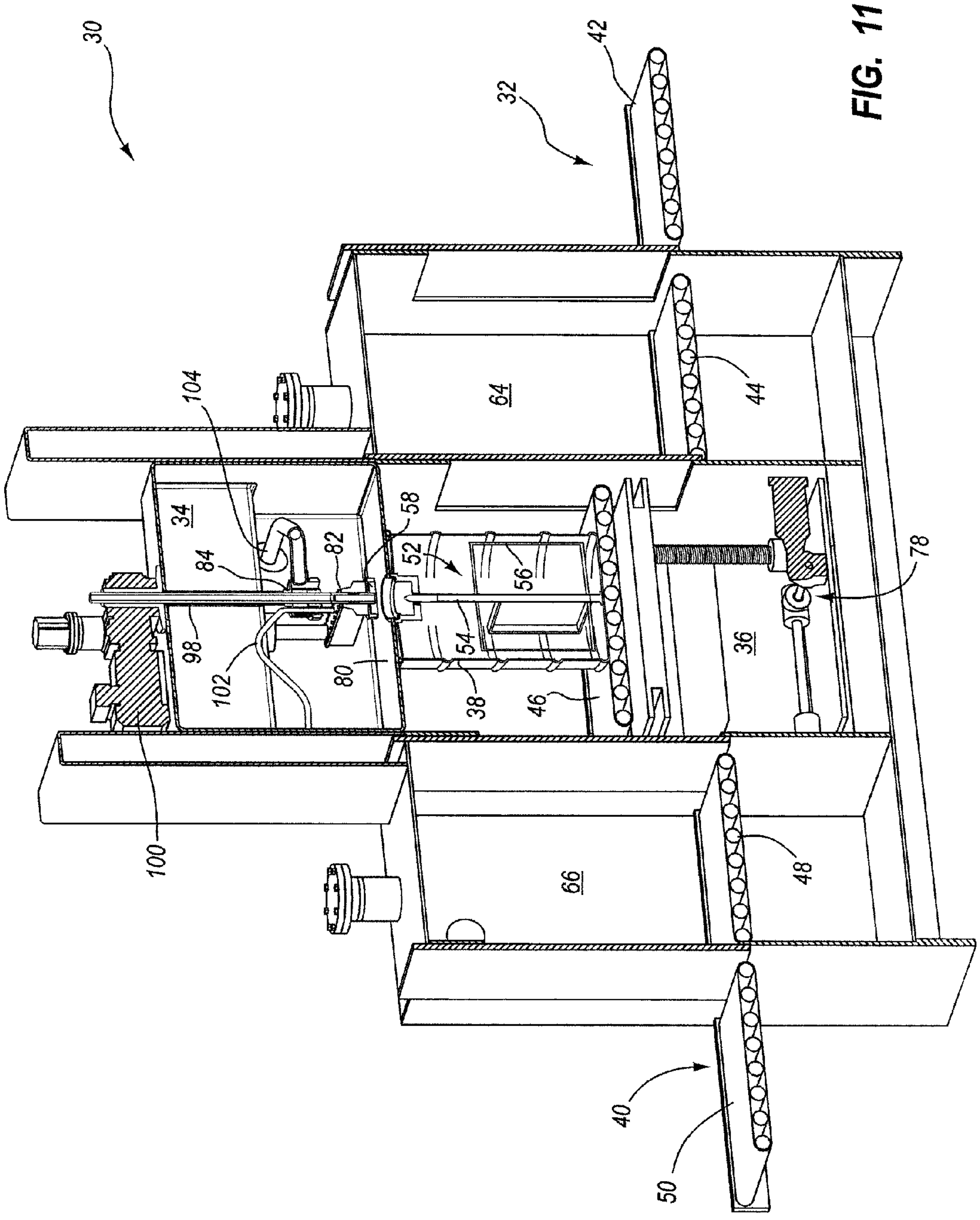

FIG. 11 shows the container after the lid handling mechanism has loosened and raised the lid of the container.

Figure 12:
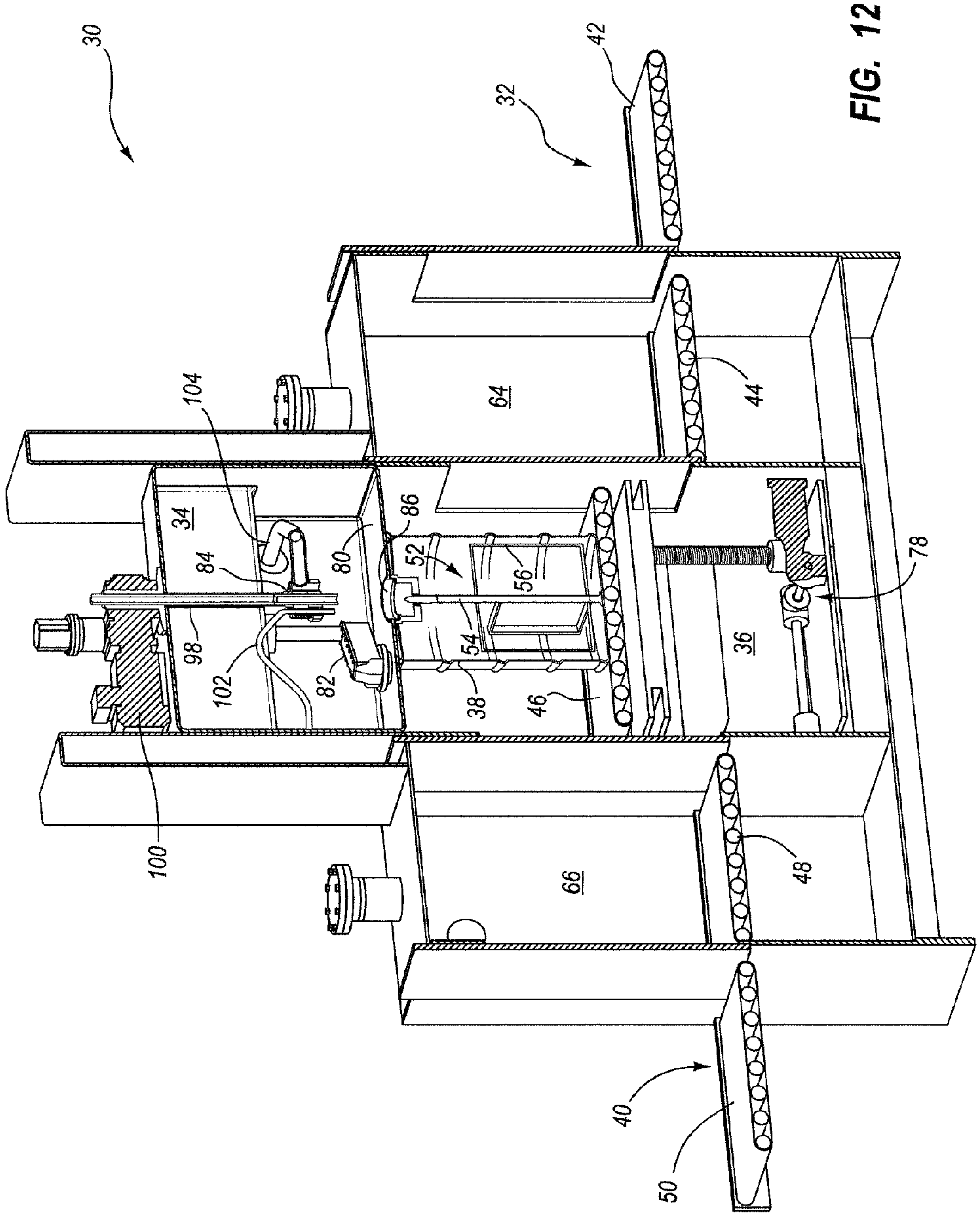

FIG. 12 shows the container with the lid removed and positioned to one side. The container is open to the primary confinement chamber.

Figure 13:
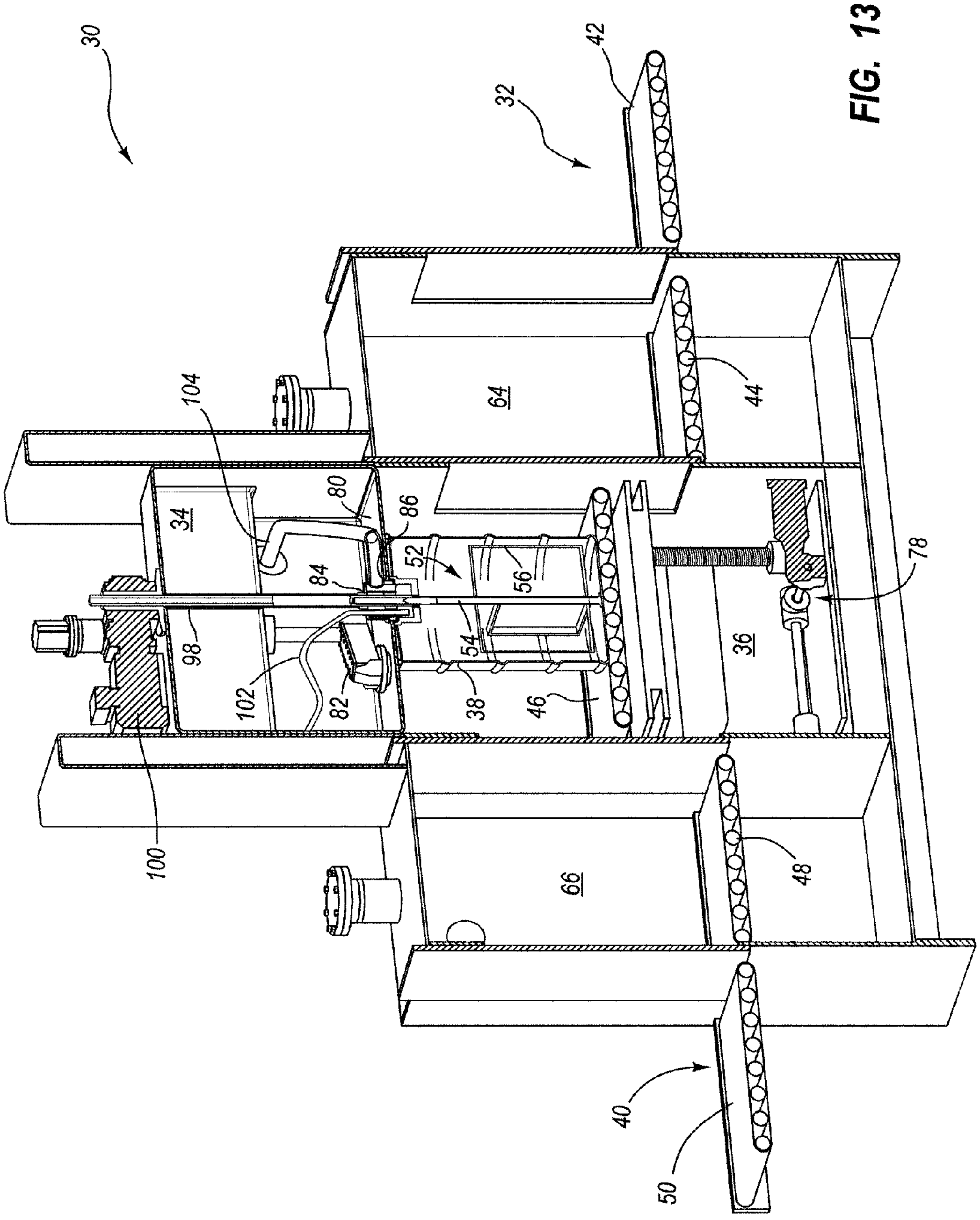

FIG. 13 shows the filling head in sealing contact with the container to fill the container and mix the contents.

Figure 14:
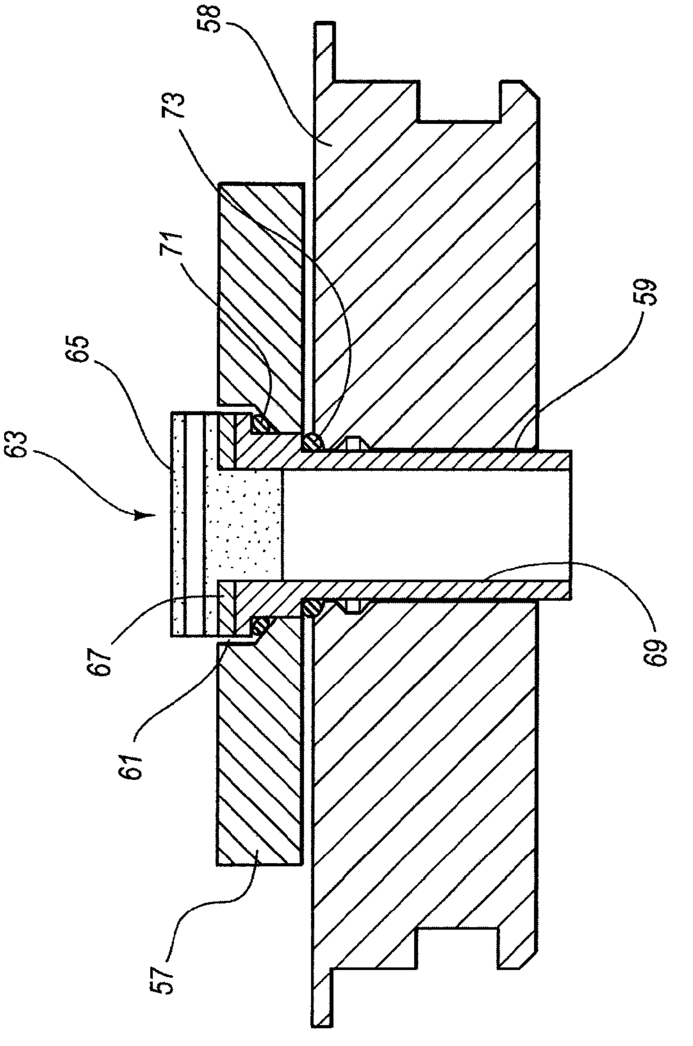

FIG. 14 shows one embodiment of a lid configuration for the container that allows the container to be vented.

Figure 15:
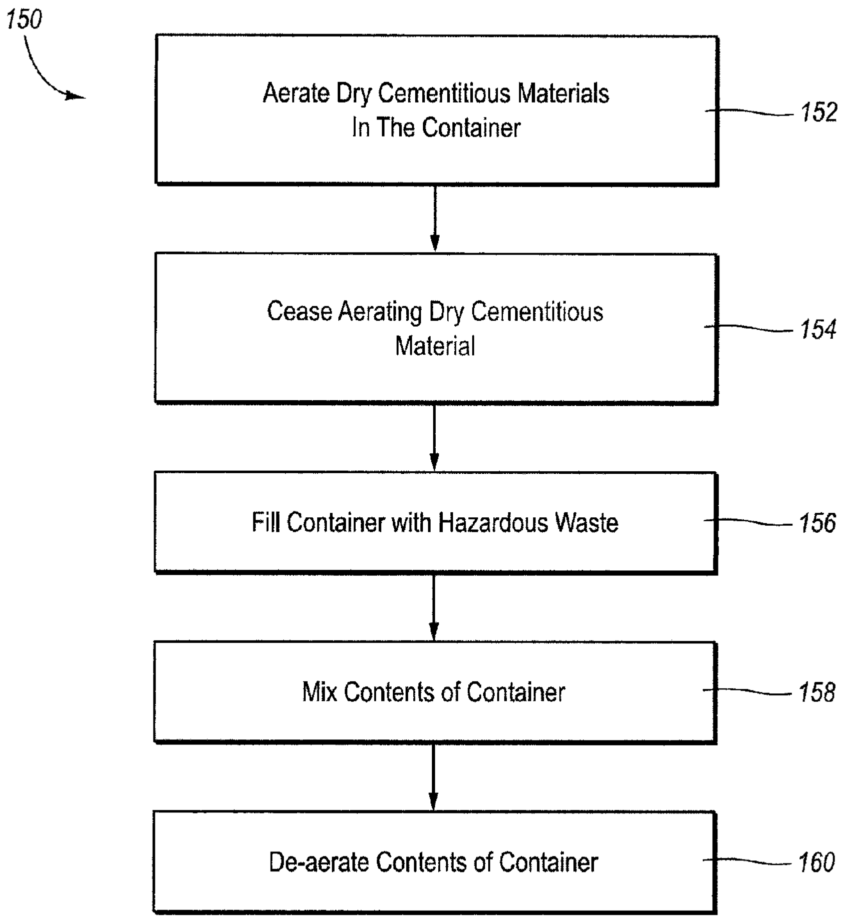

FIG. 15 is a flow diagram of one method that may be used to fill and/or mix the contents of the container.

DETAILED DESCRIPTION

The systems and/or methods described herein may be used to safely and efficiently fill a container with hazardous waste. The system may also be used to mix the hazardous waste and a solidifying material in the container. The solidifying material sets up to form a solid block that encapsulates the hazardous waste. Once the hazardous waste is immobilized in the solidifying material, the entire container may be stored or disposed of in accordance with applicable laws and regulations.

The system may have a variety of configurations, each of which may provide a number of advantages. For example, the system may be designed to make it unnecessary to transport the open container between stations when it is filled with hazardous waste. Eliminating the need to transport the container when it is open reduces the risk of contamination to the surrounding area and to the exterior of the container. Also, the system may be designed to prevent or at least minimize the adverse effects caused by dust. For example, the solidifying material, which typically creates a significant amount of dust when it is added to the container, may be added to the container before they are processed through the system. Any dust generated at this stage can be handled in a conventional manner since the dust is uncontaminated with hazardous waste.

The system may also use a bagless transfer type configuration to isolate any potential contamination to a primary confinement chamber. The outer lid to the container may be removed and the container may be positioned in sealing contact with the bagless transfer port and the lid handling mechanism. The inner lid of the container is removed exposing only the inside surface of the container to the primary confinement chamber while the container is filled with hazardous waste. The inner lid may be coupled to the container before the container is moved again so that during the entire process, the interior of the container is only exposed to the primary confinement chamber.

In one embodiment, the system is configured to fill containers with radioactive waste material and especially radioactive material that emits an undesirable amount of alpha particles (e.g., CH-TRU). The system confines alpha particle contamination to the primary confinement chamber. It should be appreciated, however, that in other embodiments the system may be configured to fill containers with any hazardous waste material. For example, chemical and biological hazardous waste may just as easily be placed in the containers.

As illustrated in FIGS. 1-4, the system 30 includes a loading area or staging area 32, a primary confinement chamber 34, a secondary confinement chamber 36, and an unloading area or exit area 40. The system 30 receives the container 38 on a conveyor 42 in the loading area 32. The conveyor 42 as well as any other conveyor used in the system 30 may be manually operated (i.e., the worker pushes the container 38 along the conveyor 42 manually) or motorized.

In one embodiment, the container 38 is partially filled with solidifying material (alternatively referred to herein as hardening material or binding material) before the container 38 is brought to the loading area 32. Pre-filling the container 38 significantly reduces, if not eliminates, the problems associated with dust when the solidifying material is added to the container 38 at the same time it is filled with hazardous waste. That being said, it should be appreciated that in other embodiments the solidifying material may be added to the container 38 in the system 30 (e.g., at approximately the same time as the hazardous waste). For example, the solidifying material may be added in the primary confinement chamber 34 as part of filling the container 38.

The solidifying material may include cementitious material, polymeric material, and the like. Preferably, cementitious material (e.g., Portland cement, grout, pulverized fly ash, blast furnace slag, and the like) and dry cement modifiers (e.g., Zircon flour and the like) are added to the container 38 as a dry powder or wet premix before the container 38 is brought to the loading area 32. If the cementitious material is a dry powder it may react with water in the hazardous waste (e.g., slurry of the hazardous waste) to form a solid block of material that encapsulates the hazardous waste. The cementitious material may also be added in the primary confinement chamber 34 as a dry powder or wet premix.

If polymeric material is used, a catalyst may be added to initiate a polymer reaction thereby encapsulating the hazardous waste in a solid block of polymeric material. The catalyst may be added before the container 38 enters the system 30, after the container 38 enters the system 30 but before hazardous waste is added, when the container 38 is open to the primary confinement chamber 34, during mixing, and so forth. It should be appreciated that the solidifying material may be any suitable material that is capable of encapsulating the hazardous waste.

The container 38 includes an outer lid 57 (FIG. 14), an inner lid 58, and a mixing mechanism 52 that is configured to mix the solidifying material and the hazardous waste material. The outer lid 57 is normally not attached until after the container 38 has passed through the system 30, or it is attached while the container is in the system 30 but after the hazardous waste material has been added and the inner lid 58 replaced onto the container 38.

In one embodiment, the inner lid 58 may have a filtered vent opening 59 to allow the container 38 to ventilate after the filling process. For example, the filtered vent opening 59 may allow the container 38 to vent after it has been filled with hazardous waste but before the outer lid 57 is attached. The filter may be any suitable filter that allows gases such as hydrogen to escape while containing hazardous materials such as radioactive particles. In one embodiment, the filter may be a paper HEPA filter that is attached to the underside of the inner lid 58 (FIG. 14).

The outer lid 57 may also have a filtered vent opening 61 to allow the container 38 to vent after the filling process is complete and the container 38 is placed in long term storage. In one embodiment, the container 38 may be configured so that the filter in the inner lid 58 is disabled once the outer lid 57 and the outer lid filter are in place. FIG. 14 depicts one example of a lid assembly configured in this manner.

After the container 38 is filled with waste, the inner lid 58 is reattached to the container 38 to close the steel fill port. The underside of the inner lid 58 has a paper HEPA filter that allows the container 38 to vent as described above. The outer lid 57 screws into the upper portion of the fill port that is larger in diameter than the portion of the fill port where the inner lid 58 is attached (see FIGS. 6 and 7). It should be noted that the depiction of the outer lid 57 in FIG. 14 is only a partial depiction to show its location. In reality, the outer lid 57 has a larger diameter than the inner lid 58 so that it can engage the threads in the upper portion of the fill port.

The outer lid 57 is designed to receive an outer lid filter assembly 63. In one embodiment, the outer lid filter assembly 63 is screwed into the outer lid 57. However, it should be appreciated that the outer lid filter assembly 63 may be coupled to the outer lid 57 in any of a number of suitable ways.

The outer lid filter assembly 63 includes a filter 65, a gasket 67, and a filter adapter 69. The filter adapter 69 is sized to receive an elongated portion of the filter 65. The gasket 67 is placed at the interface between the filter 65 and the filter adapter 69 to prevent any potential leaks. A first seal 71 (e.g., an O-ring) is positioned at the interface of the outer lid assembly 63 and the outer lid 57, and a second seal 73 (e.g., an O-ring) is positioned where the outer lid 57, inner lid 58, and the outer lid filter assembly 63 meet. The seals 71, 73 function to prevent any leaks around the filter assembly 63.

The filter assembly 63 is used to puncture the filter in the inner lid 58. When the filter assembly 63 is first inserted into the vent opening 61, the outer surface of the filter adapter 69 comes into contact with the second seal 73 thereby preventing any contaminants from escaping as the filter assembly 63 is moved further downward. The filter adapter 69 eventually reaches the filter on the underside of the inner lid 58. As the filter assembly 63 is screwed further into the vent opening 61, the filter adapter 69 punctures the filter on the underside of the inner lid 58. Once the outer lid filter assembly 63 is securely in place, the filter 65 is the only filter that gases must pass through to exit the container 38. The filter 65 may be any suitable filter such as the NUCFIL brand of filters manufactured by Nuclear Filtration Technology, Golden, Colo.

The mixing mechanism 52 includes a shaft 54 and one or more paddles, vanes, or blades 56. The upper portion of the shaft 54 is secured to a guide bracket located directly underneath the fill port (FIG. 10). The lower portion of the shaft 54 is secured to a guide assembly in the bottom of the container 38 (FIG. 10). Securing the shaft 54 at the top and bottom in this manner ensures that the mixing mechanism rotates concentrically. The shaft 54 may have any suitable configuration. In one embodiment, the shaft 54 is a square hollow shaft that can be readily engaged by a powered drive shaft. The paddles 56 can be made of any suitable material and have any suitable shape as long as the paddles 56 are capable of mixing the hazardous waste and the solidifying material in the container 38. It should be noted that the mixing mechanism 52 is encapsulated in the container 38 with the hazardous waste.

It should be appreciated that the container 38 may be any suitable container that is capable of effectively holding the hazardous waste. The container 38 may be made of any suitable material or combination of materials such as steel, concrete, polymer, and/or lead. Waste that is highly radioactive may need to be placed in thick containers or in containers lined with a dense material such as lead to block beta and gamma radiation from escaping into the surrounding area. Other waste that may be less radioactive, such as CH-TRU, may be effectively stored in conventional steel drums or barrels. Examples of suitable containers may include casks, high integrity containers, waste boxes, barrels, drums, and the like.

As illustrated in FIGS. 1-4, the system 30 may also include air locks or confinement chambers 64, 66 positioned on each side of the secondary confinement chamber 36. The container 38 moves through the air locks 64, 66 on conveyors 44, 48, respectively. Doors are provided between the air locks 64, 66 and/or the secondary confinement chamber 36 to prevent the spread of contaminants. Thus, the air locks 64, 66 may be included to provide an added layer of protection against contamination. It should be appreciated that the system 30 may be configured without any of the air locks 64, 66. Also, the system 30 may include two or more air locks on each side of the secondary confinement chamber 36.

Each of the confinement chambers 34, 36 (and optionally the air locks 64, 66) may be enclosed by a see-through panel that includes a plurality of glove ports 68. The glove ports 68 are openings that are fitted with gloves to allow a worker to manipulate the container 38 and other components in the confinement chambers 34, 36 without being exposed to the hazardous waste material. FIG. 1 illustrates a worker using the glove ports 68 in the secondary confinement chamber 36 to manipulate the container 38. The worker may use the glove ports 68 to move the container 38 along conveyors 44, 46, 48 in the air lock 64, the secondary confinement chamber 36, and the air lock 66, respectively, until the container 38 reaches conveyor 50 in the unloading area 40. Also, it should be appreciated that glove ports 68 may be provided on both sides of the confinement chambers 34, 36 and/or the air locks 64, 66.

The system 30 is designed so that the hazardous waste is only exposed to the interior of the primary confinement chamber 34. The secondary confinement chamber 36 and the air locks 64, 66 are ordinarily not exposed to the hazardous waste but serve as containment in an abnormal event. In one embodiment, the system 30 may be configured to further minimize the spread of contamination by creating airflow from areas of lower potential contamination to the areas of higher contamination. This may be accomplished by creating a pressure differential in these areas that causes air to flow in the desired manner. For example, the air pressure in the primary confinement chamber 34 may be reduced below the air pressure in the secondary confinement chamber 36 so that if there is a leak between the two areas, air will flow into the area of higher contamination. Likewise, the air pressure in the secondary confinement chamber 36 may be lower than the air pressure in the air locks 64, 66 so that air will flow from the air locks 64, 66 to the secondary confinement chamber 36.

FIGS. 9-13 show one embodiment of the system 30 being used to fill the container 38. The container 38 is initially positioned in the secondary confinement chamber 36 as shown in FIG. 9. A lift mechanism or elevator 78 is positioned in the secondary confinement chamber 36 to lift the container 38 until it makes sealing contact with a wall 80 that divides the primary confinement chamber 34 and the secondary confinement chamber 36. The lid 58 of the container 38 makes sealing contact with the underside of a lid handling mechanism 82.

Figure 5:
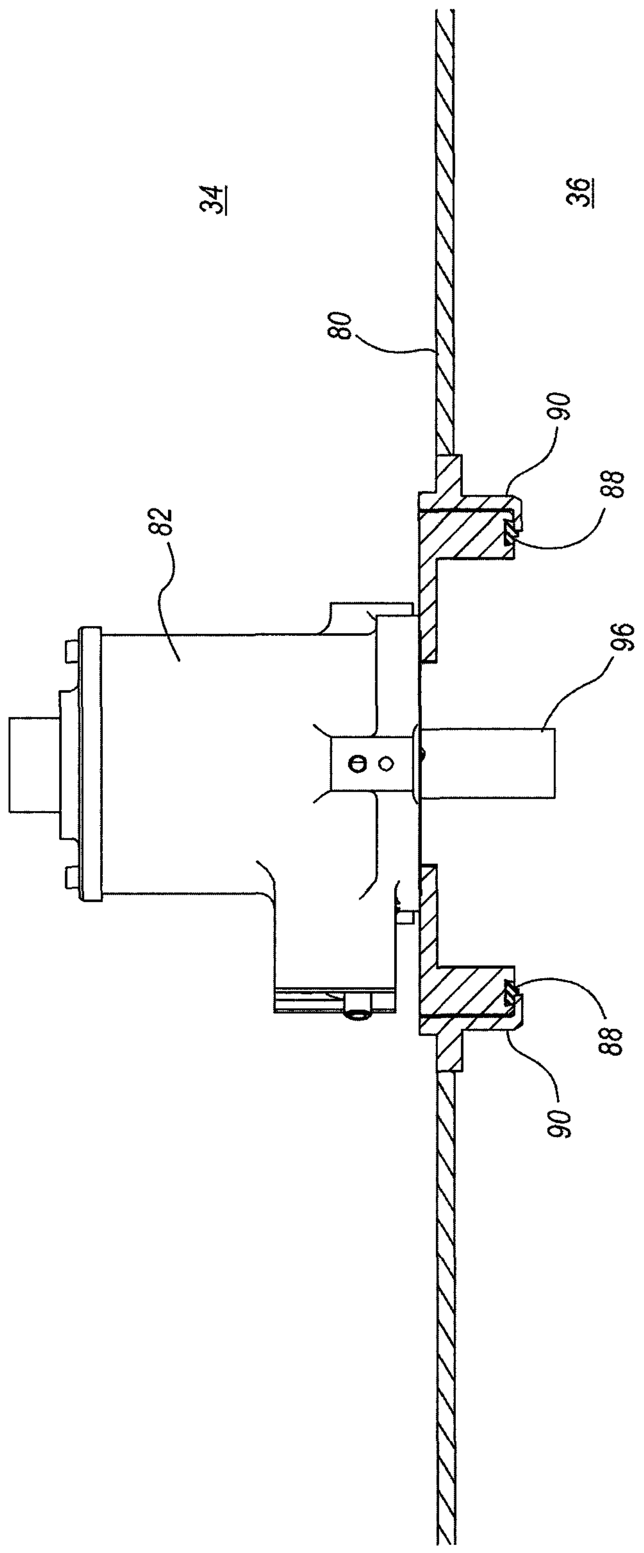
FIG. 5 is a sectional view of one embodiment of a lid handling mechanism positioned in sealing contact with a dividing wall to prevent cross contamination between a primary confinement chamber and a secondary confinement chamber.

The lid handling mechanism 82 and a filling head 84 are positioned in the primary confinement chamber 34. The wall 80 includes an opening 86 that is initially closed by the lid handling mechanism 82 as shown in FIG. 5. Thus, the bottom of the lid handling mechanism 82 is exposed to the secondary confinement chamber 36 and the remainder of the lid handling mechanism 82 is exposed to the primary confinement chamber 34. A seal 88 is positioned between the lid handling mechanism 82 and the rim or lip 90 of the opening 86 to prevent contaminants from passing from the primary confinement chamber 34 to the secondary confinement chamber 36. It should be noted that the seal 88 extends beyond the rim 90 of the opening 86 as illustrated in FIG. 5.

Figure 6:
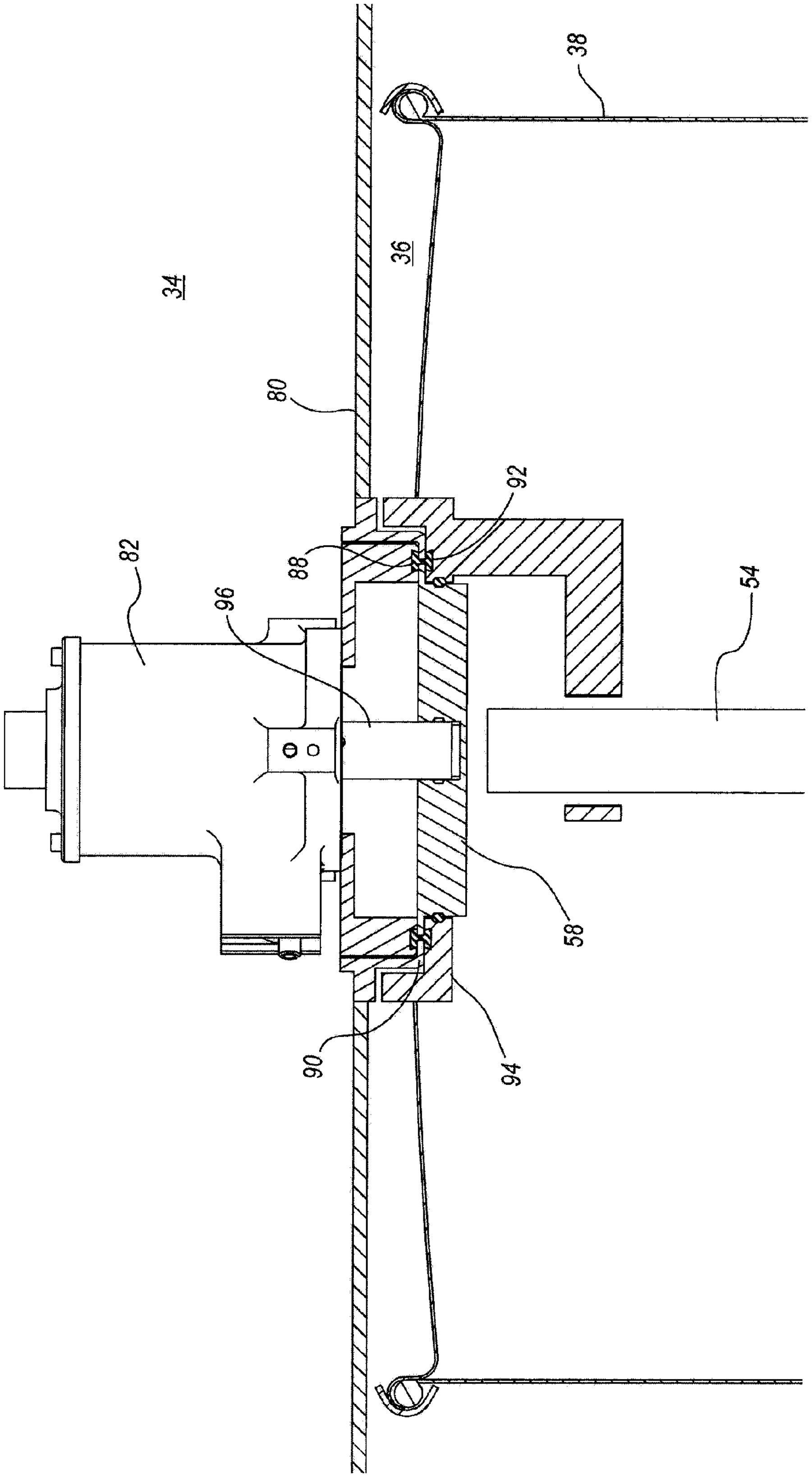
FIG. 6 is a sectional view of a container positioned underneath the lid handling mechanism and in sealing contact with the dividing wall.

The container 38 contacts and seals against the rim 90 of the opening 86 as shown in FIG. 6. The lid 58 contacts the portion of the seal 88 that extends radially inward from the rim 90 to form a seal between the lid 58 and the bottom of the lid handling mechanism 82. Also, the container 38 includes a separate seal 92 positioned on a rim 94 that surrounds the lid 58. The seal 92 is configured to contact the underside of the rim 90 around the hole 86 to form a seal between container 38 and the wall 80.

The lid handling mechanism 82 includes a mechanism 96 that engages the inner lid 58. The mechanism 96 is used to selectively remove and reattach the lid 58 to the container 38. The mechanism 96 may also be used to hold the lid 58 in a sealed configuration against the bottom of the lid handling mechanism 82. It should be appreciated that any suitable mechanism may be used as the mechanism 96. Suitable mechanisms include a ball lock, expanding fingers, screw, etc. It should be appreciated that the lid 58 is configured to correspond to the particular configuration of the mechanism 96 to allow the mechanism 96 to engage the lid 58.

The inner lid 58 is designed to allow for its remote removal by the lid handling mechanism 82 and to act in concert with the lid handling mechanism 82 and the rim or lip 90 of the opening 86 as a confinement boundary. The lid 58 may be configured to engage the remainder of the container 38 in any suitable manner. For example, in one embodiment, the lid 58 may be coupled to the remainder of the container 38 using a garter spring. The garter spring is a flexible helical spring that is positioned in a groove and pushed against the lid 58. The lid 58 may be removed by pulling hard to overcome the force of the spring. In other embodiments, the lid 58 may be a ball lock mechanism, or may be screwed into the remainder of the container 38 and the lid handling mechanism 82 may be configured to unscrew the lid 58. Once the lid 58 has been loosened from the container 38, the lid handling mechanism 82 lifts it vertically and pivots it or slides it horizontally to move the lid 58 away from the opening 86 as illustrated in FIGS. 10-12.

The filling head 84 is positioned directly above the opening 86 and is configured to move telescopically toward and away from the opening 86. Once the lid 58 is out of the way, the filling head 84 may be lowered until it contacts and seals with the rim 90 around the opening 86 as illustrated in FIGS. 8 and 13. The filling head 84 includes a drive shaft 98 that engages the shaft 54 of the mixing mechanism 52 (e.g., the drive shaft 98 may have a nose that is shaped to correspond with the shaft 54; for example, the nose may be square and sized to fit inside the hollow square shaft 54). A motor 100 is positioned above the primary confinement chamber 34. The motor 100 is operably coupled to the drive shaft 98 to power rotation of the shafts 98, 54 and consequently the paddles 56. Thus, the motor 100 may be used to mix the contents of the container 38.

The filling head 84 may be raised and lowered in any of a number of different ways. In one embodiment, the filling head 84 is raised and lowered pneumatically. This is advantageous because the compressed air allows for some damping so that the drive shaft 98 of the filling head 84 can smoothly and securely engage the shaft 54. In another embodiment, the filling head 84 may be raised and lowered using an electrically operated mechanism. The drive shaft 98 may have a spring mounted nose (FIG. 8) that allows the drive shaft 98 to smoothly and securely engage the drive shaft 54. It should be appreciated that the filling head 84 may be raised and lowered in other ways such as hydraulically.

The container 38 may be configured to contact the wall 80 in a manner that creates friction that is sufficient to resist the rotational torque exerted on the container 38 as the paddles 56 rotate. In one embodiment, the amount of friction between the container 38 and the wall 80 may be increased by coating the container 38 and/or the wall 80 with a high friction material. It should be appreciated that the container 38 may also be held in place (especially resist rotation during mixing) in any of a number of other suitable ways. For example, the container may be held in place by a recess in one of the container 38 or the wall 80 that receives a tab that extends outward from the other one of the container 38 or the wall 80.

It should be appreciated that the motor 100 may be any suitable motor that is capable of rotating the paddles 56. In one embodiment, the motor 100 may be a variable speed motor that uses, for example, a variable frequency drive to change the rotational speed. A variable speed motor may be desirable to allow for a wide range of speeds to be utilized during the mixing cycle. For example, it may be desirable to initially mix the contents of the container 38 vigorously, then reduce the mixing rate as the process proceeds. Near or at the end of the process, it may be desirable to slow the mixing speed to de-aerate the contents of the container 38. In another embodiment, the motor 100 may be designed to operate at a fixed speed.

The filling head 84 also includes a filling tube 102 and a vent 104. The filling tube 102 is in fluid communication with a source of hazardous waste (e.g., a tank or hopper of hazardous waste) that can be selectively pumped into the container 38. The filling tube 102 may be provided with anti-capillary features and an engineered low point to prevent or at least minimize dripping. For example, the filling tube 102 may have anti-capillary features such as a knife edge or an anti-capillary groove on the outer surface of the filling tube 102.

Preferably, the hazardous waste is provided in the form of a slurry or sludge that can be pumped through the filling tube 102. In other embodiments, however, the hazardous waste may be dissolved into solution so that a liquid is output from the filling tube 102. It should be appreciated, however, that in other embodiments, the filling head 84 may be configured to dispense hazardous waste in the form of a powder, a solid, or in solution.

The vent 104 is provided to allow air to escape from the container 38 and to maintain the container 38 at a lower pressure than the surrounding confinement chambers. The air may be filtered using one or more HEPA filters or other suitable filters. In one embodiment, a pre-filter or roughing filter may be provided to prevent large amounts of dust (e.g., cement dust) from overloading and clogging the HEPA filter. The pre-filter may be positioned to allow it to be regularly replaced via the glove ports 68 in the primary confinement chamber 34. The HEPA filter may also be positioned so that it can be replaced via the glove ports 68.

The ability of the filling head 84 to dispense hazardous waste, mix the container 38, and vent air, provides a number of advantages over conventional systems. For example, the filling head 84 eliminates the need to perform each function sequentially or to have multiple holes in the container 38 to allow each function to be performed simultaneously.

The system 30 may also be configured to include additional mechanisms in the primary confinement chamber 34. For example, the system 30 may include one or more additional mechanisms to add dry cementitious material to the container, add premixed wet cementitious materials to the container, add cementitious material to seal off the top of the lid, and/or measure the level and test whether the contents of the container meet quality assurance requirements (e.g., penetrometer, and so forth). It should also be appreciated that the filling head 84 and/or the lid handling mechanism 82 may be modified to perform any of these functions.

Once the contents of the container 38 have been thoroughly mixed, the filling head 84 is disengaged from the container 38 and the inner lid 58 is reattached to the container by reversing the operation used to remove the lid 58. If the garter spring is used to hold the lid 58 to the container 38, then the lid 58 is simply pushed back onto the container 38.

The outer surface of the lid 58 and the bottom of the lid handling mechanism 82 have been sealed to each other so that when the container 38 is lowered away from the wall 80, the outer surface of the lid 58 and the bottom of the lid handling mechanism 82 are not contaminated. All of the surfaces that were exposed in the primary confinement chamber 34 are either still in the primary confinement chamber 34 or are inside the container 38. In one embodiment, the secondary confinement chamber 36 may include a radiation monitor. The user may be able to swab the container 38 via the glove ports 68 and put the swab in the radiation monitor to determine the presence or absence of contamination on the container 38. Once the container 38 has been filled, it is ready to be moved out of the system 30 and disposed of.

The contents of the container 38 may be mixed using any suitable process. In one embodiment, the system 30 may be configured to mix the contents of the container 38 as the hazardous waste is added. The mixing may continue for some period of time after all of the hazardous waste has been added to provide greater dispersion of the hazardous waste in the solidifying material. In another embodiment, all of the hazardous waste may be added before mixing begins.

In one embodiment, the container 38 may be mixed using the process 150 illustrated in FIG. 15. The container 38 is prefilled with a dry cementitious material. At step 152, the motor 100 in combination with the shaft 54 and paddles 56 is used to aerate or fluff the dry cementitious material. Aerating the cementitious material renders it more suitable for mixing with and absorbing liquids. At step 154, the aerating process stops when the motor 100 is turned off. At step 156, hazardous waste is introduced into the container 38 through the filling tube 102. Preferably, the hazardous waste is a slurry, sludge, or in some other form that includes a liquid component that reacts with the cementitious material. At step 158, the motor 100 is restarted to mix the contents of the container 38 to make room for additional hazardous waste. At step 160, the speed of the motor 100 is reduced near the end of the mixing process to de-aerate the contents of the container 38. This process is advantageous because it greatly reduces the torque requirement on the motor 100. This allows a smaller, less expensive motor 100 to be used.

It should be appreciated that the process 150 may be modified in a number of ways. For example, all or substantially all of the hazardous waste may added to the container 38 while the motor 100 rotates the paddles 56.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for filling a container with hazardous waste comprising:

a primary confinement chamber;

a filling head positioned in the primary confinement chamber, the filling head being configured to add the hazardous waste to the container, drive movement of a mixing mechanism in the container, and vent air from the container; and a lid handling mechanism positioned in the primary confinement chamber, the lid handling mechanism being configured to couple a lid to the container.

2. The system of claim 1 wherein the lid handling mechanism is configured to remove the lid from the container.

3. The system of claim 1 wherein the system is configured so that the interior of the container is only open to the primary confinement chamber as the container passes through the system.

4. The system of claim 1 wherein the system is configured to fill the container with radioactive waste.

5. The system of claim 1 wherein the system is configured to fill a steel drum with the hazardous waste.

6. The system of claim 1 comprising a secondary confinement system that includes a secondary confinement chamber configured to house the exterior of the container as the container is being filled by the filling head.

7. The system of claim 6 wherein the system is configured to, from the primary confinement chamber, add dry or wet cementitious material to the container, add cementitious material to seal off the lid of the container, measure the level of the container, and/or test whether the contents of the container meet quality assurance requirements.

8. A system for filling a container with hazardous waste comprising:

a filling head configured to add the hazardous waste to the container, drive movement of a mixing mechanism in the container, and vent air from the container; and a lid handling mechanism configured to couple a lid to the container;

wherein the system is configured to hold the container in a stationary position between when the filling head accesses the container and the lid handling mechanism accesses the container.

9. A system for filling a container with hazardous waste comprising:

a primary confinement chamber;

one or more mechanisms positioned in the primary confinement chamber, the one or more mechanisms being configured to add the hazardous waste to the container, drive movement of a mixing mechanism in the container, vent air from the container, add dry or wet cementitious material to the container, add cementitious material to seal off the lid of the container, measure the level of the container, and/or test whether the contents of the container meet quality assurance requirements; and a lid handling mechanism positioned in the primary confinement chamber, the lid handling mechanism being configured to couple a lid to the container.

10. A system for filling a container with hazardous waste comprising:

one or more mechanisms that is configured to add the hazardous waste to the container, drive movement of a mixing mechanism in the container, vent air from the container, add dry or wet cementitious material to the container, add cementitious material to seal off the lid of the container, measure the level of the container, and/or test whether the contents of the container meet quality assurance requirements; and a lid handling mechanism configured to couple a lid to the container;

wherein the system is configured to hold the container in a stationary position between when the filling head accesses the container and the lid handling mechanism accesses the container.

* * * * *